US008666149B2

(12) United States Patent  (10) Patent No.: US 8,666,149 B2
Thorne  (45) Date of Patent: Mar. 4, 2014

(54) METHOD FOR EDITING A MULTI-POINT FACIES SIMULATION

(75) Inventor: Julian Thorne, Orange, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 24 days.

(21) Appl. No.: 13/564,225

(22) Filed: Aug. 1, 2012

(65) Prior Publication Data

US 2014/0037197 A1    Feb. 6, 2014

(51) Int. Cl.
*G06K 9/62* (2006.01)

(52) U.S. Cl.
USPC .................. 382/159; 382/109; 703/2; 703/10

(58) Field of Classification Search
USPC .................................. 382/109, 159; 703/2, 10
See application file for complete search history.

(56) References Cited

U.S. PATENT DOCUMENTS

| | | | |
|---|---|---|---|
| 6,035,255 A * | 3/2000 | Murphy et al. ............. | 702/11 |
| 7,079,953 B2 | 7/2006 | Thorne et al. | |
| 7,516,055 B2 | 4/2009 | Strebelle | |
| 7,630,517 B2 | 12/2009 | Mirowski et al. | |
| 7,970,593 B2 | 6/2011 | Roggero et al. | |
| 2006/0041409 A1 | 2/2006 | Strebelle et al. | |
| 2010/0332205 A1 | 12/2010 | Tillier et al. | |
| 2011/0153285 A1 | 6/2011 | Da Veiga et al. | |
| 2011/0213600 A1 | 9/2011 | Strebelle | |
| 2011/0231164 A1 | 9/2011 | Zhang et al. | |
| 2011/0251833 A1 | 10/2011 | Mariethoz et al. | |
| 2012/0296618 A1 * | 11/2012 | Hocker ..................... | 703/10 |

FOREIGN PATENT DOCUMENTS

| | | |
|---|---|---|
| FR | 2905181 A1 | 2/2008 |
| GB | 1584060 A | 2/1981 |
| WO | 2006113502 A2 | 10/2006 |
| WO | 2009090522 A1 | 7/2009 |
| WO | 2009138290 A2 | 11/2009 |

OTHER PUBLICATIONS

Mirowski Stationarity Scores on Training Images for Multipoint Geostatistics Mirowski PW; Tetzlaff DM; Davies RC; McCormick DS; Williams N; Signer C May 31, 2009.
Khodabakhshi Multipoint Statistical Characterization of Geologic Facies from Dynamic Data and Uncertain Training Images Morteza Khodabakhshi; Behnam Jafarpour Oct. 11, 2011.
Zhang Incorporating Geological Conceptual Models and Interpretations into Reservoir Modeling Using Multiple-Point Geostatistics Zhang Tuanfeng Jan. 31, 2008.

* cited by examiner

*Primary Examiner* — Gregory M Desire
(74) *Attorney, Agent, or Firm* — Albert Shung

(57) ABSTRACT

A computer system and a hybrid method for combining multipoint statistic and object-based methods include creating a multi-point statistics (MPS) model using a MPS method that satisfies conditioning data and constraints, the multi-point statistics being derived from a training image created using training-image generation parameters; generating one or more object-shape templates and depositional coordinates of each facies type using the parameters; positioning the templates within the MPS model such that the templates maximally correlate to the MPS model; assigning to each of the positioned templates a unique event; determining which cells are available for editing; and assigning the cells that are available for editing to facies if the cells are contained by a facies template positioned within the MPS model at its optimally correlating location.

34 Claims, 10 Drawing Sheets

METHOD FOR EDITING A MULTI-POINT FACIES SIMULATION

FIELD

The present invention pertains in general to computation methods and more particularly to a computer system and computer-implemented method of combining multipoint statistic and object-based methods for creating reservoir property models and method for editing a multipoint facies simulation (MPS).

BACKGROUND

In the characterization of oil fields in the petroleum industry, three-dimensional (3D) modeling using geostatistics is often used to assess reservoir heterogeneity and connectivity. Geostatistics often uses kriging to interpolate between data points or conditioning data. Conditioning data includes well log hard data, but can also include soft data, typically seismic data.

Conventional 3D modeling methods are based on variogram or two-point-statistics. Variogram-based algorithms allow integrating well and seismic data using a pixel-based approach. First, well data are blocked to the reservoir stratigraphic grid, i.e. well data values are assigned to the cells that the wells penetrate and sample. Then, all unsampled cells in the reservoir stratigraphic grid are simulated conditional to well and seismic data using some form of kriging. However, the models built using conventional variogram-based methods are most often not consistent with geological interpretation. Variogram-based geostatistics is inadequate in integrating geological concepts: two-point statistics variograms do not allow modeling complex geological heterogeneity. As a result, the variogram-based methods usually generate models that provide poor reservoir performance forecasting.

Over the past 10 years, the traditional variogram-based methods have been replaced by Multiple Point Statistics (MPS) methods. The MPS approach replaces traditional variograms with 3D numerical conceptual models of the subsurface geology, also known as training images.

MPS simulation is a reservoir facies modeling technique that uses conceptual geological models as 3D training images (or training cubes) to generate geologically realistic reservoir models. The training images provide a conceptual description of the subsurface geological geobodies, based on well log interpretation and general experience in reservoir architecture modeling. MPS simulation extracts multiple-point patterns from the training image and anchors the patterns to reservoir well data. A 3D data template is provided by a user to define the dimensions of the multi-point patterns to be reproduced from the training image. Specifically, a size of the 3D data template corresponds to the maximum number of conditioning data used to infer statistics from the training image during the MPS simulation process.

Another facies modeling technique is the object-based modeling (also referred to as Boolean modeling) technique. Object-based modeling is a method that uses and distributes quantifiable 3D facies geometries or shapes in an earth model. In the object-based modeling method, a variety of predefines 3D geological shapes, such as polygonal shapes, cylindrical shapes or more complex shapes, are used to model distribution of facies in an earth model.

Both multi-point statistics (MPS) and object-based modeling have advanced the state-of-the-art in geostatistical facies-based property modeling to build geocellular models for reservoir simulation. MPS has the benefit that it can far more easily match conditioning facies data with well data. Object-based modeling has the benefit that "depositional" property trends (such as sedimentary deposits) can be placed within the objects that follow the boundaries of the objects in a way that resembles true sedimentary deposits.

However, none of the conventional methods achieves the desired result in creating a facies-based reservoir model that can match conditioning facies data with well data as well as provide the ability to place depositional trends within boundaries of objects to simulate true sedimentary deposits. Furthermore, none of the conventional methods are capable of reproducing large scale facies continuity that is present in training images. Therefore, there is a need for methods that cure the above and other deficiencies of conventional MPS and object-based methodologies.

SUMMARY

An aspect of the present invention is to provide a computer-implemented hybrid method for combining multipoint statistic and object-based methods. The hybrid method includes creating, using a computer system, a multi-point statistics (MPS) model using a MPS method that satisfies conditioning data and constraints in which the multi-point statistics are derived from a training image created using training-image generation parameters; and generating, using the computer system, one or more object-shape templates of a 2D or 3D object-shape and depositional or structural coordinates of each facies type using the training image generation parameters. The hybrid method further includes positioning, using the computer system, the one or more generated object-shape templates within the MPS model such that the one or more generated object-shape templates maximally correlate to the MPS model; and assigning, using the computer system, to each of the one or more positioned object-shape templates a unique event reference and assigning the same unique event reference to cells within or in the vicinity of each corresponding object-shape template. The hybrid method also includes providing, using the computer system, depositional or structural coordinates to each cell associated with a given event number in the MPS model using a relative position of the cell within the object associated with the event number; and modeling properties using the depositional or structural coordinates, using the computer system, to capture geological trends within each object-shape template.

A further aspect of the present invention is to provide a computer system for implementing a hybrid method for combining multipoint statistic and object-based methods. The computer system includes a computer readable memory configured to store input data comprising conditioning data, constraints, and training-image generation parameters. The computer system further includes a processor configured to read input data including the conditioning data and constraints and the training-image generation parameters to: (a) create a multi-point statistics (MPS) model using a MPS method that satisfies the conditioning data and the constraints in which the multi-point statistics are derived from a training image created using the training-image generation parameter; (b) generate one or more object-shape templates of a 2D or 3D object-shape and depositional or structural coordinates of each facies type using the training image generation parameters; (c) position the one or more generated object-shape templates within the MPS model such that the one or more generated object-shape templates maximally correlate to the MPS model; (d) assign to each of the one or more positioned object-shape templates a unique event reference and assigning the same unique event reference to cells within or in the vicinity of each corresponding object-shape template; (e) provide depositional or structural coordinates to each cell associated with a given event number in the MPS model using a relative position of the cell within the object associated with the event number; and (f) model properties using the depositional or structural coordinates to capture geological trends within each object-shape template.

Another aspect of the present invention is to provide a computer-implemented hybrid method for combining multipoint statistic and object-based methods. The hybrid method includes creating, using a computer system, a multi-point statistics (MPS) model using a MPS method that satisfies conditioning data and constraints in which the multi-point statistics are derived from a training image created using training-image generation parameters; and generating, using the computer system, one or more object-shape templates of a 2D or 3D object-shape and depositional or structural coordinates of each facies type using the training image generation parameters. The method further includes positioning, using the computer system, the one or more generated object-shape templates within the MPS model such that the one or more generated object-shape templates maximally correlate to the MPS model; and assigning, using the computer system, to each of the one or more positioned object-shape templates a unique event reference and assigning the same unique event reference to cells within or in the vicinity of each corresponding object-shape template. The method also includes determining, using the computer system, which cells are to be left unedited and which cells are available for editing; and assigning, using the computer system, the cells that are available for editing to facies if the cells that are available for editing are contained by a facies object-shape template positioned within the MPS model at its optimally correlating location.

A further aspect of the present invention is to provide a computer system for implementing a hybrid method for combining multipoint statistic and object-based methods. The computer system includes a computer readable memory configured to store input data comprising conditioning data, constraints, and training-image generation parameters. The computer system further includes a processor configured to read input data including the conditioning data and constraints and the training-image generation parameters to: (a) create a multi-point statistics (MPS) model using a MPS method that satisfies conditioning data and constraints in which the multi-point statistics are derived from a training image created using training-image generation parameters; (b) generate one or more object-shape templates of a 2D or 3D object-shape and depositional or structural coordinates of each facies type using the training image generation parameters; (c) position the one or more generated object-shape templates within the MPS model such that the one or more generated object-shape templates maximally correlate to the MPS model; (d) assign to each of the one or more positioned object-shape templates a unique event reference and assigning the same unique event reference to cells within or in the vicinity of each corresponding object-shape template; (e) determine which cells are to be left unedited and which cells are available for editing; and (f) assign the cells that are available for editing to facies if the cells that are available for editing are contained by a facies object-shape template positioned within the MPS model at its optimally correlating location.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
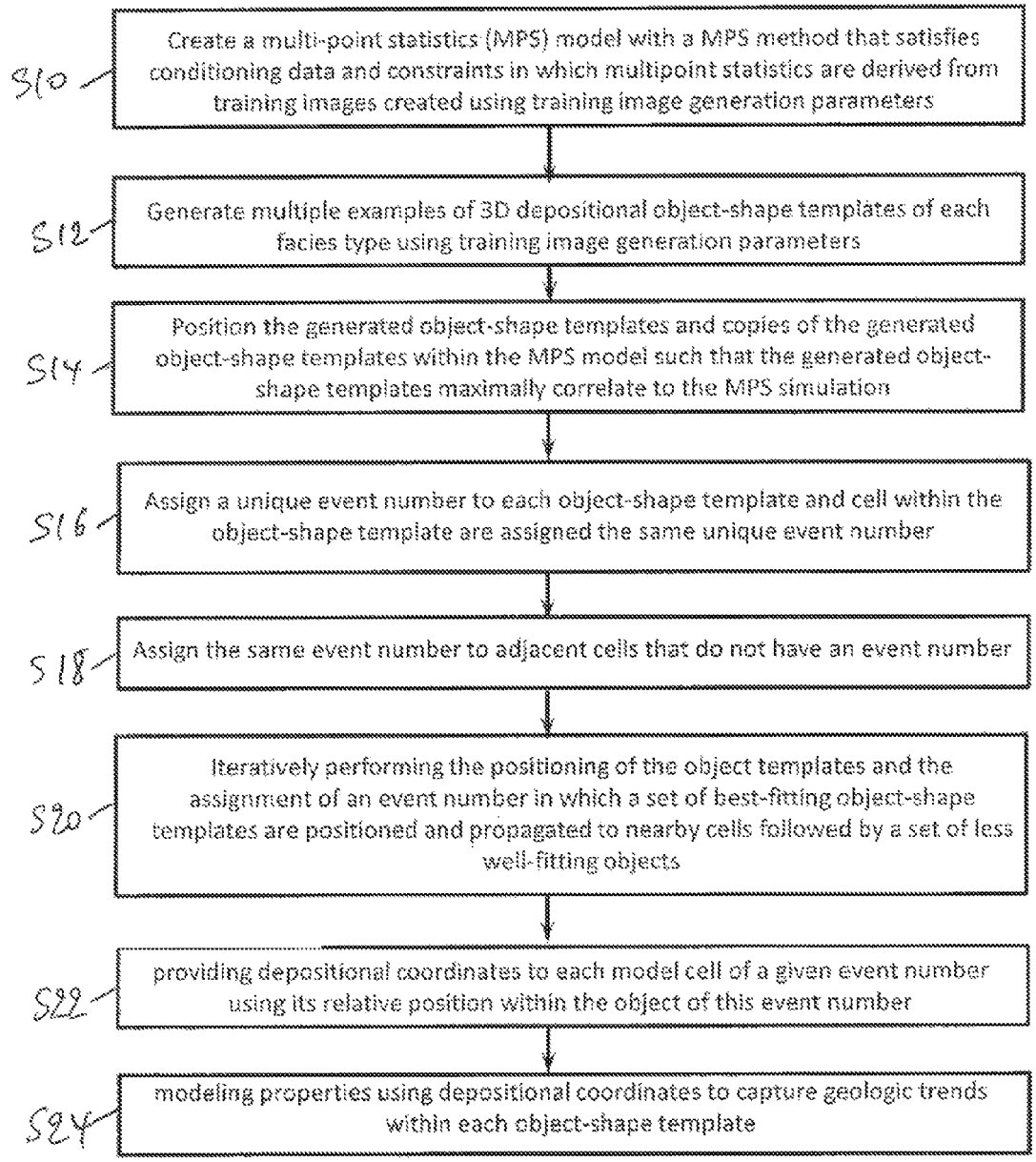
FIG. 1 is a flow chart of a hybrid method of combining multipoint statistic and object-based methods for creating reservoir property models suitable for reservoir flow simulation, according to an embodiment of the present invention.

FIG. 1 is a flow chart of a hybrid method of combining multipoint statistic and object-based methods for creating reservoir property models suitable for reservoir flow simulation, according to an embodiment of the present invention. The method includes creating a multi-point statistics (MPS) model, at S10. The MPS model can be created using any MPS method that satisfies conditioning data and constraints in which the multi-point statistics are derived from training images created using training-image generation parameters. Training image generation parameters include object shapes orientation, position, size, etc. Examples of shapes include a triangle, a square, a rectangle, a semi-circle, a ribbon, or more complex shapes.

In one embodiment, an MPS method may include building a grid in a desired geological region and interpreting facies at specific cells within the grid (the MPS grid). The method also includes building or generating a MPS training image (i.e., a 3D training image or training cube). The MPS training image can be built as a collection of facies patterns that contain no absolute or relative spatial information, i.e., the training image is not conditioned to well data. For example, training images can be generated, for example, using information from aerial photography, pictures of outcrops, hand-drawn sketches, etc.

In one embodiment, one method used to build MPS training images includes generating unconditional object-based models. First, dimensions, shapes, and orientations of each facies are described and then associations among various facies (sand, shale, clay, etc.) are specified. Next, geometry constraints (such as azimuth angle, object size, etc.) and proportion constraints (i.e., facies proportion map or facies proportion curves) of the various facies within the MPS training images can be specified.

The MPS modeling method further includes performing an MPS simulation to obtain a simulated image showing the facies model. MPS simulation infers at each cell of the reservoir geological grid the local facies probabilities (i.e. the probability that each facies exists at the cell location) given the conditioning data closest to the cell, and then drawing a facies value from these probabilities using a Monte-Carlo method. The local facies probabilities are inferred by looking in the MPS training image for all the patterns that match the conditioning data. Therefore, an MPS simulation includes assigning facies to each pixel within each cell of the reservoir geological grid.

The computation of local facies probabilities includes counting the number of times patterns similar to the conditioning data, i.e., patterns that have the same geometrical configuration and same data values as the conditioning data, can be found in the MPS training image. In another embodiment, instead of repeatedly scanning the training image for each cell to be simulated, all the patterns present in the training image are stored, prior to the simulation, in a dynamic data structure table called search tree. Only patterns that actually occur over the MPS training image are stored in the search tree. A data template is defined to limit the geometric extent of these patterns. The size of this data template corresponds to the maximum number of conditioning data that will be used to simulate each unsampled cells. The search tree is stored in a storage device or memory. The search tree is organized to allow a relatively fast retrieval of any particular pattern, thus a relatively fast computation of facies probabilities given any particular conditioning pattern. An example MPS method can be found in U.S. patent application Ser. No. 13/493,062 entitled "SYSTEM AND METHOD FOR OPTIMIZING THE NUMBER OF CONDITIONING DATA IN MULTIPLE POINT STATISTICS SIMULATION" by Sebastien B. Strebelle et al., the entire contents of which is incorporated herein by reference.

The method further includes generating one or more (for example, multiple) 3D object-shape and depositional or structural coordinates of each facies type (also referred to as one or more object-shape templates) using training image generation parameters, at S12. The term "depositional coordinates" which relates to the deposition of facies in a geological sense is used herein for illustration purposes only and is not intended to be limiting. As it can be appreciated other types of coordinates can be employed such as more generally a structural coordinate related to the structure of the facies. Training image generation parameters include object shapes, orientation, position, size, etc. Similar to the MPS simulation, examples of shapes include a triangle, a square, a rectangle, a semi-circle, a ribbon, or more complex shapes. Therefore, there may be a collection of object-shapes that may include rectangles with different sizes and orientation, triangles with different sizes and orientation and ribbons of different sizes and orientation, etc. Each of object shapes (with an orientation and size) can be represented as a digital cube of pixels. It is noted that the object-shape templates associated with the generating of an object-based training image can be the same or different from the object-shapes associated with the MPS training image in the MPS simulation.

If training images are generated with more than one object, only objects that are isolated from other objects are used as object-shape templates. Training images generated with only one object can enhance the efficiency of creating object-shape templates. In one embodiment, when applying object-shape templates to a grid, the object-shape templates that intersect a grid boundary are generally not used. However, the object-shape templates that intersect a grid boundary may be used in some circumstances. For example, if a vast majority of objects generated within a grid having a same size as the a grid of an MPS model and having the specified training-image parameters intersect a specific grid boundary, then intersection of the object-shape template with that specific grid boundary is not rejected. For example, long north-south oriented channel objects always intersect the north and south boundaries of the training image and MPS grid. Hence, intersection with these boundaries is not used as a rejection criterion to reject the objects intersecting the boundaries.

In one embodiment, the specified parameters for object-shape template generation (i.e., the shape of the object, the size of the object, the orientation of the object, the position of the object, etc.) can be the same as the parameters used for MPS facies simulation but can also be different.

The method further includes positioning the generated object-shape templates and copies of the generated object-shape templates within the MPS model such that generated object-shape templates maximally correlate to the MPS simulation, at S14. This can be accomplished using any algorithm for pattern recognition. The method further includes assigning to each such positioned object-shape template a unique event reference, such as for example a unique event number, and the cells within the object-shape template are also assigned the same unique event number, at S16. In the following paragraphs, the term "event number" is employed for illustration purposes without any intention to limit to only "a number." Indeed, as it can be appreciated any type of "event reference" can be used including a letter, a tag, a flag, an indicium, or a number, or any combination thereof. The method may further include assigning the same event number to adjacent or neighboring cells that do not have an event number, at S18.

In one embodiment, the positioning may include convolving the object-shape templates with the MPS model to produce a convolution score volume for each object-shape template. The convolution score can be normalized by its standard deviation. Local maximum of the convolution score are candidate positions to position object-shapes within the MPS model.

For example, a first object-shape template can be convolved with the MPS model to produce a first convolution score volume. The first convolution score can be normalized to obtain a first normalized convolution score and a local maximum of the first normalized convolution score can be determined. Similarly, a second object-shape volume template can be convolved with the same MPS model to produce a second convolution score volume. The second convolution score can be normalized to obtain a second normalized convolution score and a local maximum of the second normalized convolution score can be determined. The method further includes comparing the local maximum of normalized convolution scores (e.g., the first normalized score and the second normalized score) produced with one object-shape template (e.g., the first object-shape template) versus another object-shape template (e.g., the second object-shape template) to determine which object-shape (e.g., the first object-shape or the second object-shape) is a better fit to the MPS model.

Figure 2:
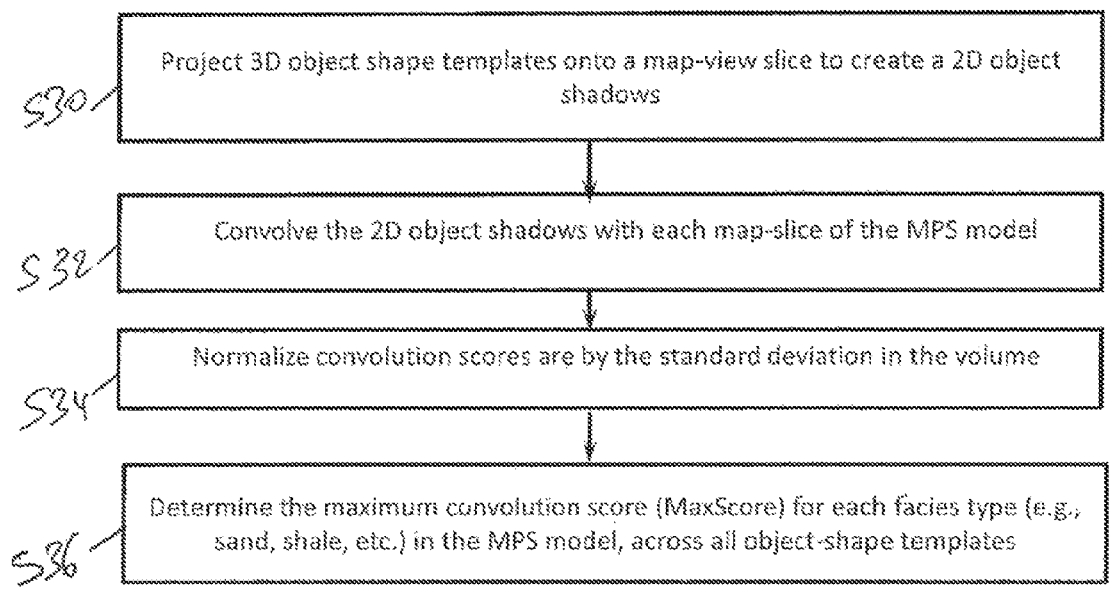
FIG. 2 is a flow diagram showing a convolving procedure for convolving the object-shape templates with the MPS model, according to an embodiment of the present invention.

In one embodiment, an approximation of this process uses a two dimensional (2D) convolution and adds the third dimension at a later stage. FIG. 2 is a flow diagram showing a convolving procedure for convolving the object-shape templates with the MPS model, according to an embodiment of the present invention. In one embodiment, the convolving procedure is performed using 2D object-shape templates instead of 3D object-shape templates. The third dimension is added after performing the convolution. For example, by using 2D object-shape templates instead of 3D object-shape templates a faster convolution process can be achieved. In one embodiment, in order to obtain the 2D object-shape templates, the 3D object shape templates are projected onto a map-view slice to create a 2D object "shadows," at S30. The object shadows are convolved with each map-slice of the MPS model, at S32. The convolution can be performed with or without using Fast Fourier Transform (FFT) methods. However, the convolution can be performed faster when using FFT methods.

After performing the convolution in the 2D space using 2D object-shape templates, convolution scores are normalized by the standard deviation in the volume, at S34. The maximum convolution score (MaxScore) is determined for each facies type (e.g., sand, shale, etc.) in the MPS model, across all object-shape templates (e.g., the first object-shape template and the second object-shape template), at S36. For example, for sand facies type, a maximum convolution score is determined from a convolution score obtained when using the first object-shape template and a convolution score obtained when using the second object-shape template. Similarly, for shale facies type, a maximum convolution score is also determined from a convolution score obtained when using the first object-shape template and a convolution score obtained when using the second object-shape template.

The method next identifies object shapes within the MPS model that best match each facies (e.g., sand, shale, etc.) by using the 2D or 3D normalized convolution scores. The first matched object is recorded as event number one. The second matched object is recorded as event number 2, etc.

Figure 3:
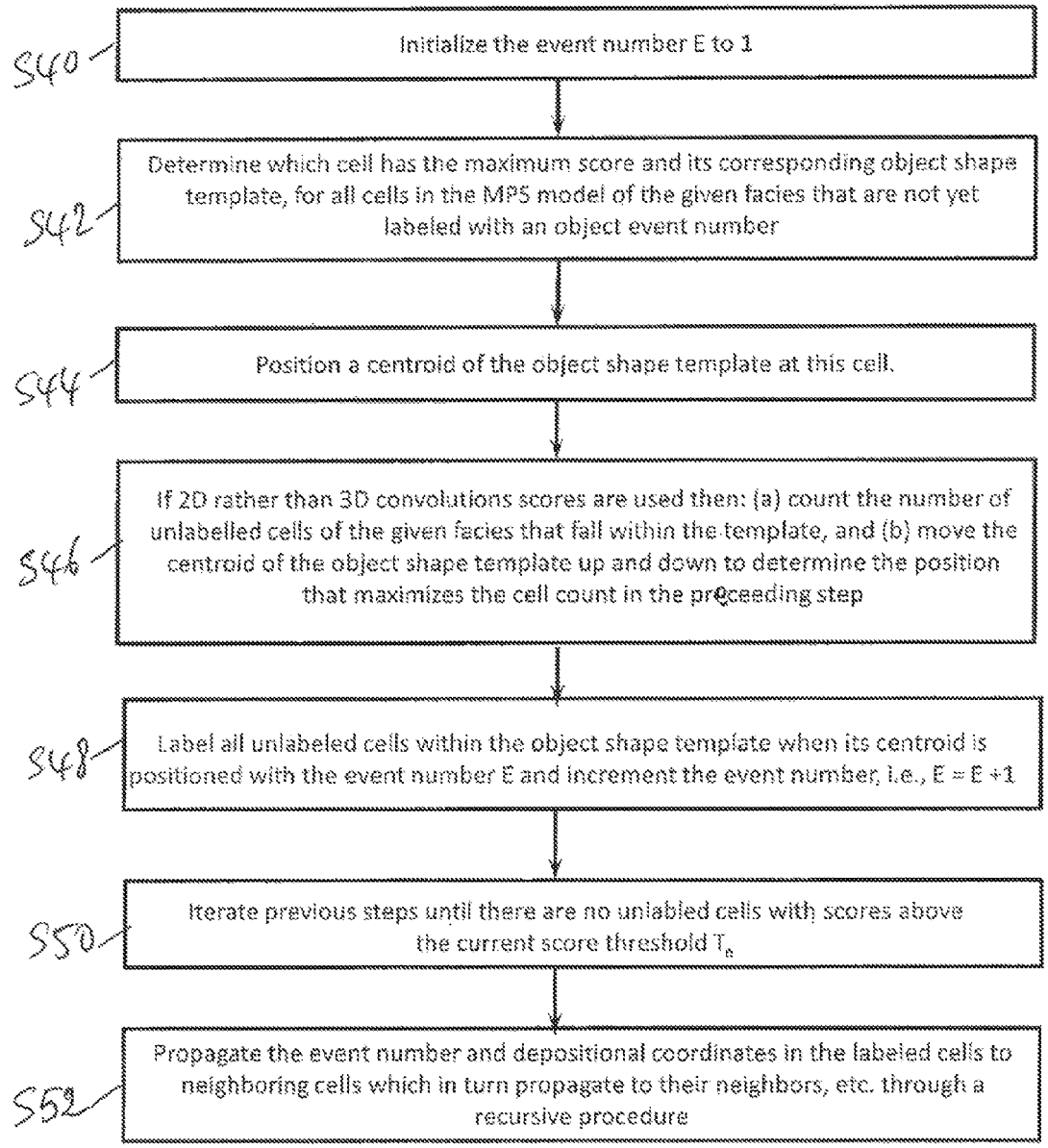
FIG. 3 is a flow diagram of a shape identification process, according to an embodiment of the present invention.

FIG. 3 is a flow diagram of a shape identification process, according to an embodiment of the present invention. In one embodiment, the shape identification process is run for a series of decreasing score thresholds, $T_1, T_2 \ldots T_n$. The procedure includes initializing the event number E to 1 (i.e., E=1), at S40. When cells in the MPS model are assigned an event number they are considered "labeled." Next, for each threshold $T_1, T_2 \ldots T_n$ the following steps are performed:

i) Determine which cell has the maximum score and its corresponding object shape template, for all cells in the MPS model of the given facies that are not yet labeled with an object event number, at S42.

ii) Position a centroid of the object shape template at this cell, at S44.

iii) If 2D rather than 3D convolutions scores are used then: (a) count the number of unlabeled cells of the given facies that fall within the template, and (b) move the centroid of the object shape template up and down to determine the position that maximizes the cell count in the preceeding step, at S46.

iv) Label all unlabeled cells within the object shape template when its centroid is positioned as in step ii) and iii) with the event number E and increment the event number, i.e., E=E+1. The object shape template depositional or structural coordinates are copied to each such cell, at S48.

v) Iterate steps i) to iv) until there are no unlabled cells with scores above the current score threshold $T_n$, at S50.

vi) Propagate the event number and depositional or structural coordinates in the labeled cells to neighboring cells which in turn propagate to their neighbors, etc. through a recursive procedure, at S52.

In one embodiment, the propagation is limited to cells that share faces except no propagation is done in the downward direction. This form of propagation is adapted to preserve object shape at the base of depositional objects. The propagation is limited to cells that have a normalized convolution score above a given propagation threshold Pthresh. In one embodiment, the threshold Pthresh is related to the score threshold $T_n$ by the following equation (1).

$$P\text{thresh}=T_n*T_n/\text{MaxScore} \qquad (1)$$

This recursive propagation procedure is finished when all unlabeled neighboring cells are either of a different facies or have convolution scores below Pthresh. Optionally, a Pthresh in the last iteration can be set to 0 to allow labeling of all MPS cells assigned a non-background facies.

The method may further comprise, iteratively, performing the positioning of the object templates and the assignment of an event number in which a set of best-fitting object shape templates are positioned and propagated to nearby cells, followed by a set of less well-fitting objects, etc., at S20. The method further includes providing depositional or structural coordinates to each model cell of a given event number using its relative position within the object of this event number, at S22.

The method further comprises modeling properties using depositional or structural coordinates to capture geologic trends within each object-shape template, at S24. In one embodiment this can be performed by creating property trends in a process that is well known from object (Boolean) modeling by using the depositional or structural coordinates to capture geological trends within each object. In one embodiment, the coordinates include distance in the transverse direction from the object axis, distance along the long axis of each object, or vertical distance from the base of the object, or any combination thereof. Property trends can be assigned either conceptually or empirically to these three coordinates such as: a) increasing clay content from an object's axis towards its margins, b) increasing clay content from proximal to distal portions, or c) increasing clay content from basal layers to top layers.

Figure 4:
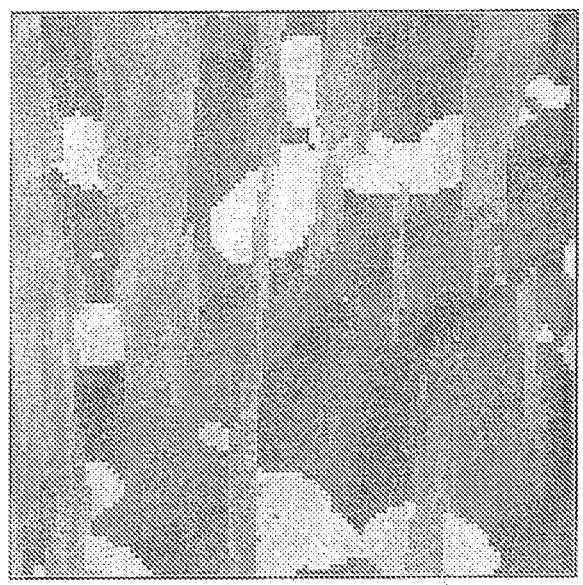
FIG. 4 depicts a training image in an MPS model.
Figure 5:
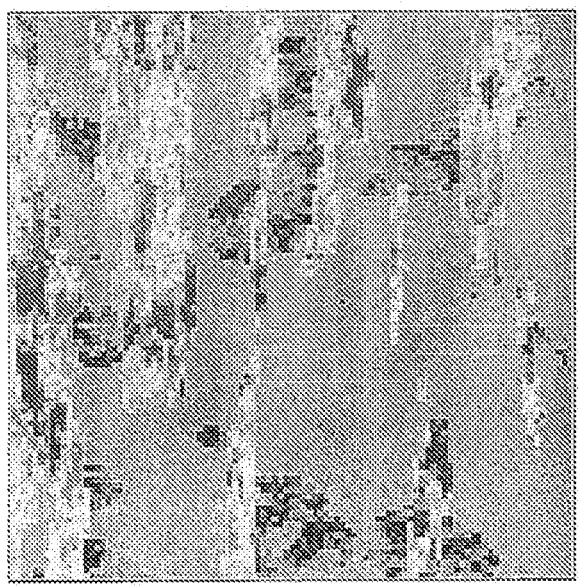
FIG. 5 depicts a property model within the MPS model shown in FIG. 4 without using the hybrid method described herein.

FIG. 4 depicts a training image in an MPS model. FIG. 5 depicts a property model within the MPS model shown in FIG. 4 without using the hybrid method described herein. The property model does not geologically follow object shapes even when anisotropy variograms are used.

Figure 6:
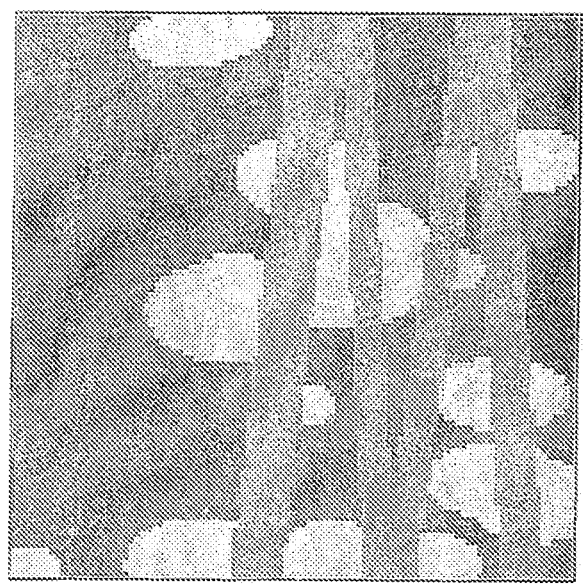
FIG. 6 depicts a slice of a training image created using training image generation parameters in an MPS model.

FIG. 6 depicts a slice of a training image created using training image generation parameters in an MPS model. FIG.

Figure 7:
FIG. 7 depicts a property trend model within the slice of the training image shown in FIG. 6 after applying the hybrid method described herein.

7 depicts a property trend model within the slice of training image shown in FIG. 6 after applying the hybrid method described herein. The property trend model is assigned using depositional or structural transverse coordinates. As shown in FIG. 7, the property trends follow object shapes and dimensions in a geologically reasonable way.

As it can be appreciated from the above paragraphs, the hybrid method provides a method for assigning each cell in a MPS model (except for background facies cells) to a specific object shape template which is only partially preserved in the MPS model. In the following paragraphs, a method for editing the MPS model in such a way to greatly increase the preservation of the object shape templates within the model and thereby significantly increase the facies continuity of the resulting model is described. One result of performing the editing method is that the edited MPS model qualitatively and quantitatively is more similar to the training image.

Figure 8:
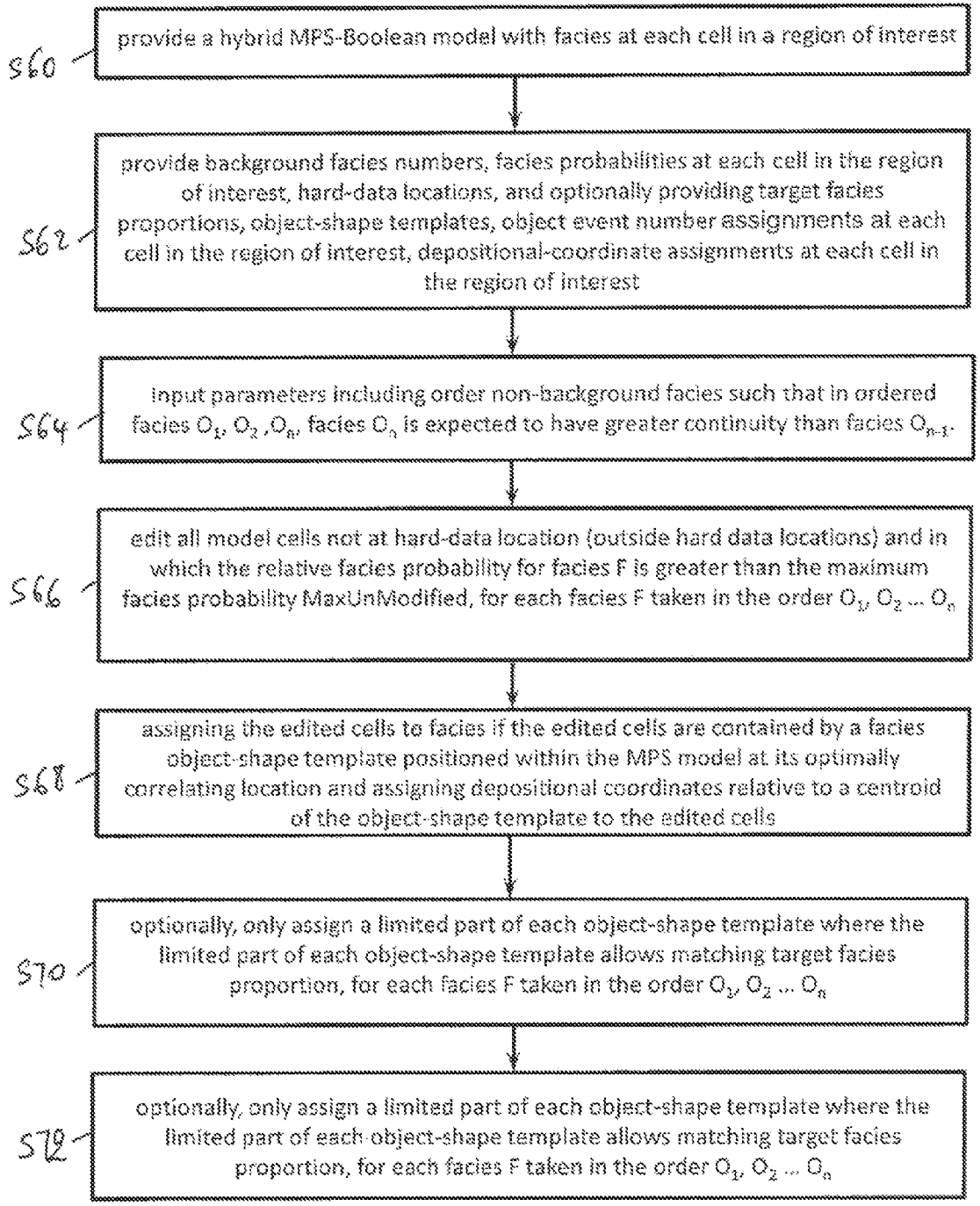
FIG. 8 is a flow diagram of a method for editing an MPS model, according to an embodiment of the present invention.

FIG. 8 is a flow diagram of a method for editing an MPS model, according to an embodiment of the present invention. In one embodiment, the method for editing the MPS model includes providing a hybrid MPS-Boolean model with facies at each cell in a region of interest, at S60. The method may further include providing background facies numbers, facies probabilities at each cell in the region of interest, hard-data locations, and optionally providing target facies proportions, object-shape templates, object event number assignments at each cell in the region of interest, depositional or structural coordinate assignments at each cell in the region of interest, at S62.

The method further includes inputting parameters. In one embodiment, the inputting includes ordering non-background facies such that in ordered facies $O_1, O_2, O_n$, facies $O_n$ is expected to have greater continuity than facies $O_{n-1}$, at S64. In one embodiment, the inputting further includes leaving the maximum facies probability unmodified (MaxUnModified) in the ordering of the facies.

The method further includes, for each facies F taken in the order $O_1, O_2, \ldots O_n$: (a) edit all model cells not at hard-data location or conditioning data locations (i.e., outside hard-data locations) and in which the relative facies probability for facies F is greater than the maximum facies probability MaxUnModified, at S66.

The method further includes (i) assigning the model cells to facies F if the edited cells are contained by a facies object shape template positioned within the model at its optimally correlating location; and (ii) assigning depositional or structural coordinates relative to the centroid of the object shape template found in the previous step (i), at S68. If more than one object shape template contains the cell, the object shape template which has the highest correlation to the unedited MPS model can be used.

The method further includes, for each facies F taken in the order $O_1, O_2, \ldots O_n$, optionally, only assign a limited number of object-shape templates where the limited number of object-shape templates allows matching target facies proportion, at S70.

The method further includes, for each facies F taken in the order $O_1, O_2, \ldots O_n$, optionally, only assign a limited part of each object-shape template where the limited part of each object-shape template allows matching target facies proportion, at S72. In one embodiment, only the basal part of objects can be used to create a realistic geologic facies pattern.

Figure 9:
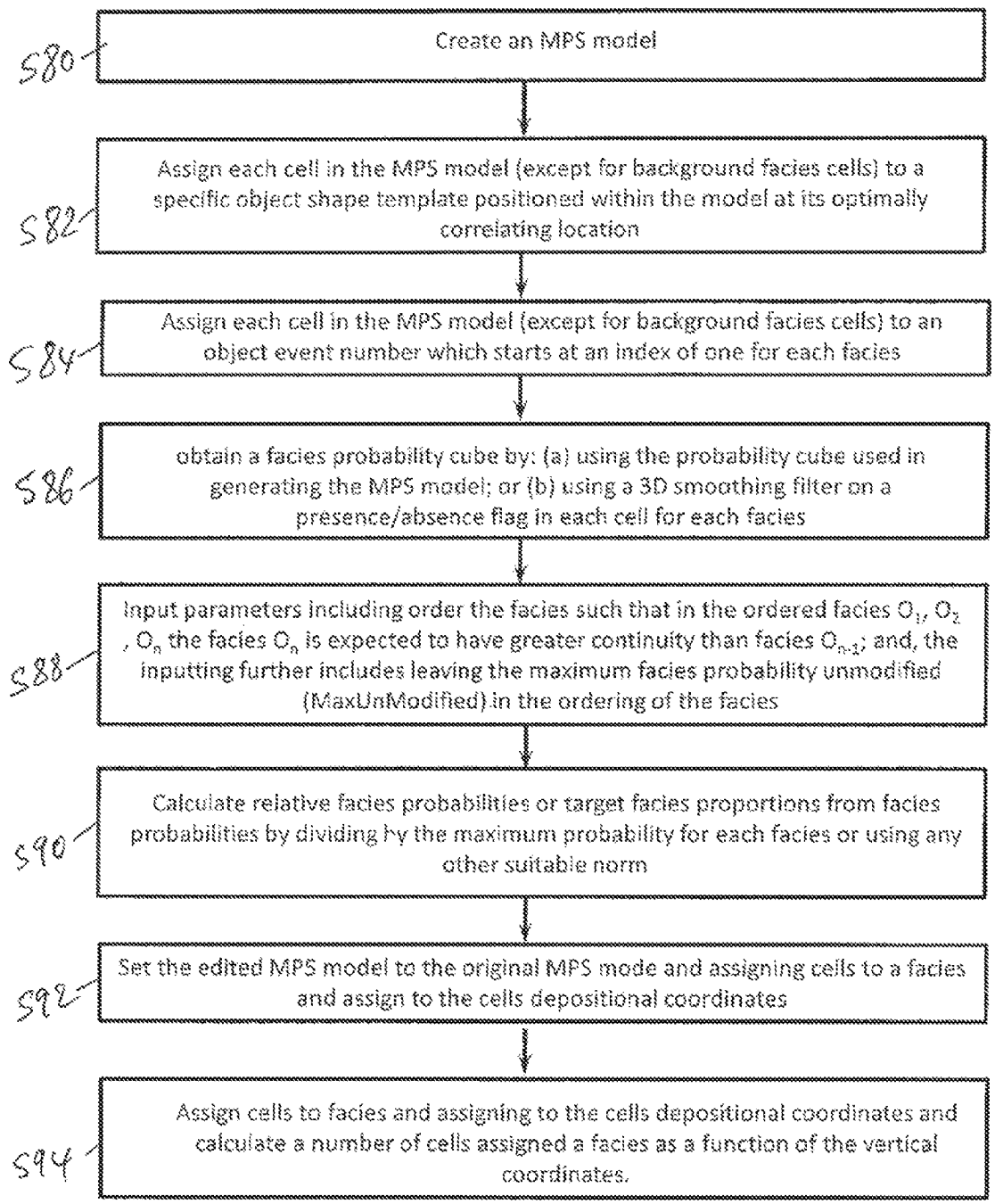
FIG. 9 is a flow diagram of a method for editing an MPS model, according to an embodiment of the present invention.

FIG. 9 is a flow diagram of a method for editing an MPS model, according to an embodiment of the present invention. In one embodiment, the editing method includes creating a MPS model using any MPS method, at S80. In one embodiment, the editing method includes assigning each cell in the MPS model (except for background facies cells) to a specific object shape template positioned within the model at its optimally correlating location as described in the above MPS-Boolean hybrid method, at S82.

The editing method further includes assigning each cell in the MPS model (except for background facies cells) to an object event number which starts at an index of one for each facies, as described in the above hybrid method, at S84. Lower objects event numbers indicate objects that better fit the MPS facies simulation.

The editing method further includes obtaining a facies probability cube by: (a) using the probability cube used in generating the MPS model; or (b) using a 3D smoothing filter on a presence/absence flag in each cell for each facies, at S86.

The editing method further includes inputting parameters. The inputting of parameters include ordering the facies such that in the ordered facies $O_1, O_2, O_n$ the facies $O_n$ is expected to have greater continuity than facies $O_{n-1}$, i.e., increasing continuity, at S88; and, the inputting further includes leaving the maximum facies probability unmodified (MaxUnModified) in the ordering of the facies.

The editing method further includes calculating relative facies probabilities or target facies proportions from facies probabilities by dividing by the maximum probability for each facies or using any other suitable norm, at S90. Alternatively, the relative facies probabilities can be obtained as an input constraint or calculated from the original input MPS model. However, there are various constraints to decide whether or not to change a cell from one facies to another. One of the constraints can be, for example, a proportion of the different facies are to be kept the same, as will be explained further in detail in the following paragraphs. However, other types of constraints can also be implemented.

The editing method includes making a list of cell locations that contain hard data (e.g., well conditioning data).

In one embodiment, the editing method includes setting the edited MPS model to the original MPS model, at S92, and, for each facies F taken in the order $O_1, O_2, \ldots O_n$, performing the following procedure of assigning cells to a facies and assigning to the cells depositional or structural coordinates, at S94:
  (a) Visiting all model cells that are not hard-data cells and are different from facies F and in which the relative facies probability is greater than MaxUnModified;
  (b) Assigning these cells to facies F if these cells are contained by a facies object-shape template positioned within the model at its optimally correlating location, as described in the above paragraphs;
  (c) Assigning to these cells depositional or structural coordinates relative to the centroid of the object shape template found previously. If more than one object shape template contains the cell, the object shape template with the lowest event number can be used;

In one embodiment, the editing method further includes, if matching target facies proportions is not required, the editing process is complete. Otherwise, if matching target facies proportions is needed, for each facies F, performing the following procedure:
  (a) Creating a list of events with hard data (F) of length (NEventsWithHardData(F)) of all object event numbers that are assigned to model cells that contain hard-data;
  (b) Calculating a total number of required cells of facies F in the final model to match the target facies proportion (NObjectCells(F));
  (c) Calculating an additional number of cells (NTargetCells(F)) to be assigned to facies F using the following equation (2). That is, the additional number of cells (NTargetCells(F)) being equal to a difference between the target facies proportion (NObjectCells(F)) and a length of the list of events with hard data NEventsWithHardData(F).

$$NTargetCells(F) = NObjectCells(F) - NEventsWithHardData(F) \quad (2)$$

(d) If the additional number of cells NTargetCells(F) is equal to or greater than zero (i.e., NTargetCells(F)= or >0), performing the following procedure.
  (i) Calculating the number of cells assigned to each object event number (which is not in the list EventsWithHardData);
  (ii) Calculating a cumulative number of cells as a function of event number; and
  (iii) Finding the event number cutoff (EventNumberCutoff(F)) such that the cumulative number of cells with event number less than the event number cutoff (EventNumberCutoff(F)) is approximately equal to the additional number of cells (NTargetCells(F)).
(e) Else, if the additional number of cells (NTargetCells(F)) is less than zero (NTargetCells(F)<0), then:
  (i) Calculating the cumulative number of cells assigned to F as a function of the vertical depositional coordinate (a vertical coordinate of 0 is at the base of the object); and
  (ii) Finding the vertical depositional coordinate cutoff (VerticalDepositionalCoordinateCutoff(F)) such that the cumulative number of cells with vertical depositional coordinates less than the vertical depositional cutoff (VerticalDepositionalCoordinateCutoff (F)) is approximately equal to the additional number of cells (NTargetCells(F)).

In one embodiment, the editing method may further include repeating, for each facies F taken in the order $O_1 \ldots O_n$, visiting all model cells with the additional cutoff constraints of event number cutoff (EventNumberCutoff(F)) or vertical depositional coordinate cutoff (VerticalDepositionalCoordinateCutoff (F)).

Figure 10:
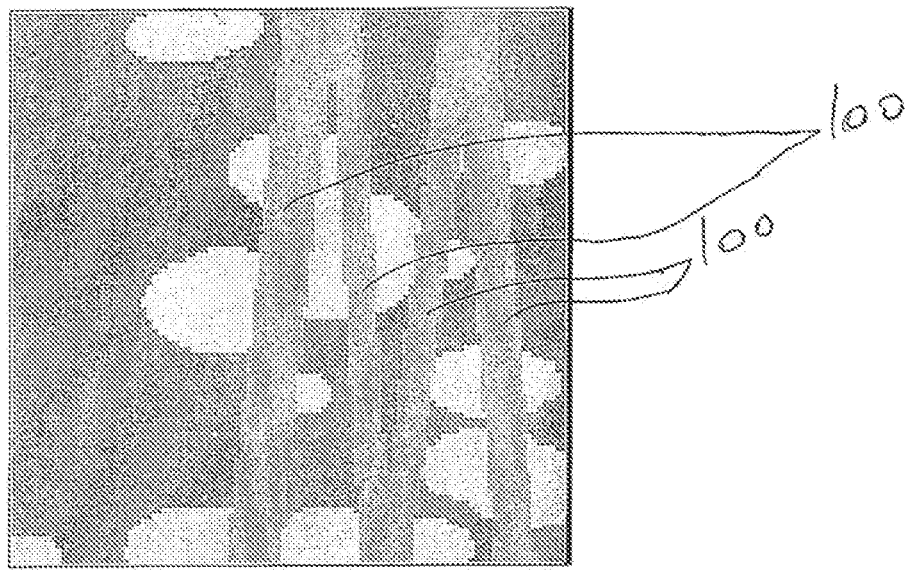
FIG. 10 depicts a 2D slice of a 3D training image which contains connected straight channels.
Figure 11:
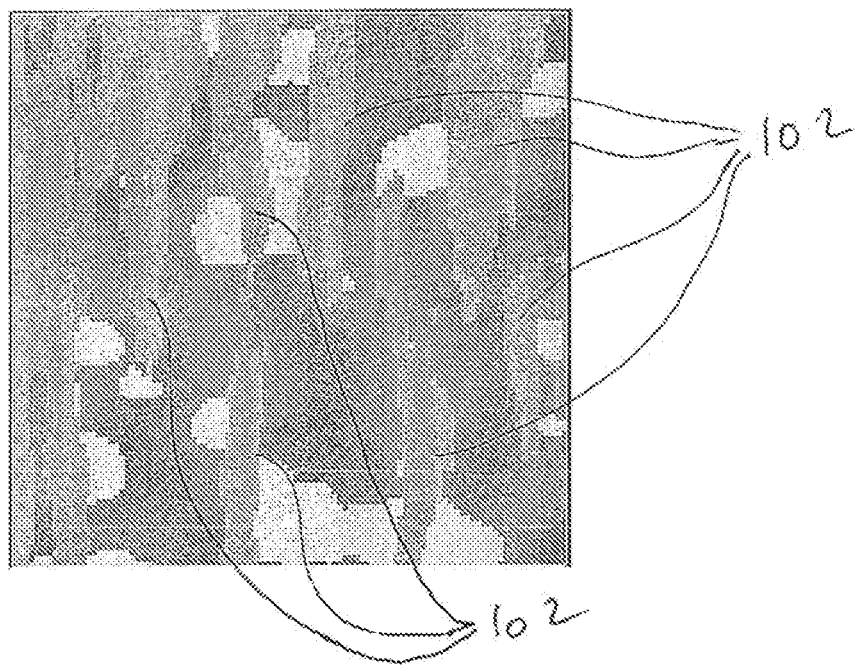
FIG. 11 depicts a 2D conventional MPS simulation based on the 2D slice of the 3D training image.

FIG. 10 depicts a 2D slice of a 3D training image which contains connected straight channels 100. FIG. 11 depicts a 2D conventional MPS simulation based on the 2D slice of the 3D training image. As shown in FIG. 11, the conventional MPS simulation generates shorter disconnected channels 102. Therefore, conventional MPS simulation has difficulty reproducing large scale facies continuity that is present in training images.

Figure 12:
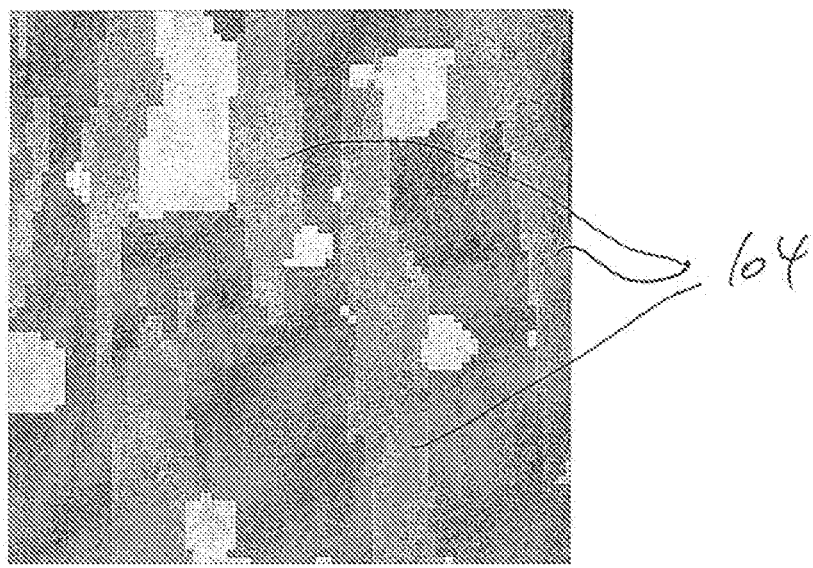
FIG. 12 depicts a 2D slice of an input MPS model, the 2D slice of the input MPS model includes disconnected channels.
Figure 13:
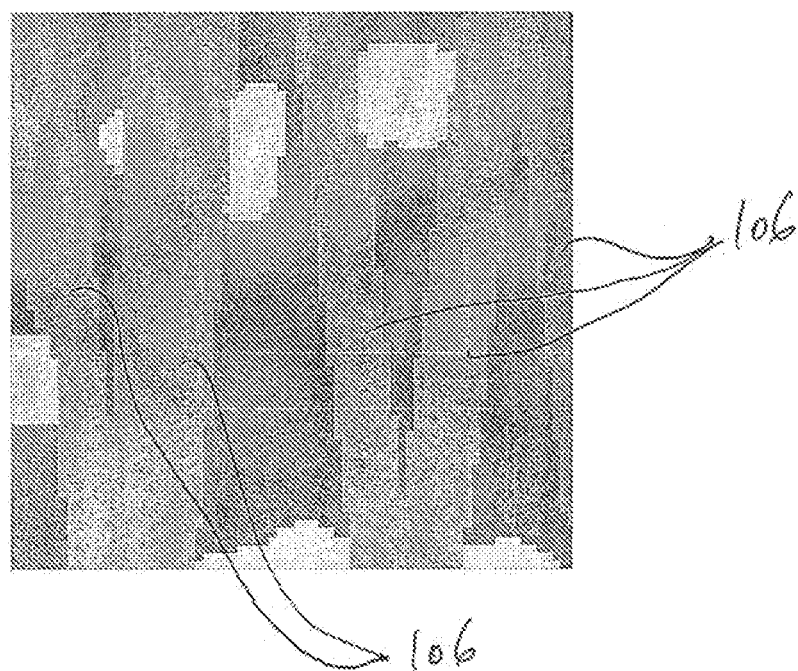
FIG. 13 depicts a 2D slice of an edited MPS model obtained using the editing method described herein.

FIG. 12 depicts a 2D slice of an input MPS model. The 2D slice of the input MPS model includes disconnected channels 104. FIG. 13 depicts a 2D slice of an edited MPS model obtained using the editing method described herein. As shown in FIG. 13, the 2D slice of the edited MPS model includes continuous channels 106. The editing method enhances the continuity and object shape reproduction which increases similarity training images.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 14:
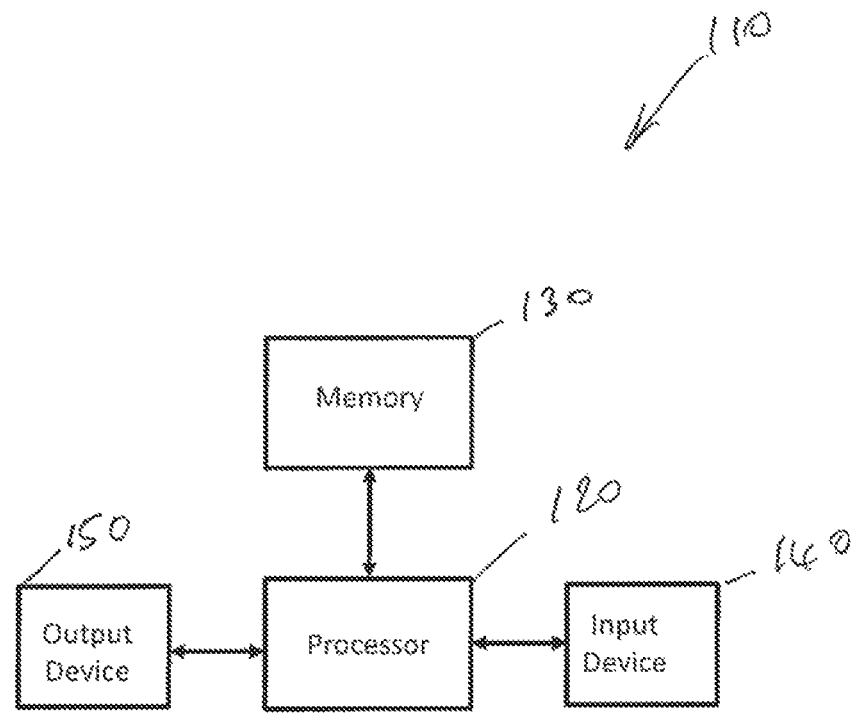
FIG. 14 is a schematic diagram representing a computer system for implementing the methods described herein, according to an embodiment of the present invention.

FIG. 14 is a schematic diagram representing a computer system 110 for implementing the methods, according to an embodiment of the present invention. As shown in FIG. 14, computer system 110 comprises a processor (e.g., one or more processors) 120 and a memory 130 in communication with the processor 120. The computer system 110 may further include an input device 140 for inputting data (such as keyboard, a mouse or the like) and an output device 150 such as a display device for displaying results of the computation As can be appreciated from the above description, the computer readable memory 130 can be configured to store input data comprising conditioning data and constraints and training-image generation parameters. The processor 120 can be configured to read input data including the conditioning data and constraints and the training-image generation parameters to: (1) create a multi-point statistics (MPS) model using a MPS method that satisfies the conditioning data and the constraints in which the multi-point statistics are derived from a training image created using the training-image generation parameter; (2) generate one or more object-shape templates of a 2D or 3D object-shape and depositional or structural coordinates of each facies type using the training image generation parameters; (3) position the one or more generated object-shape templates within the MPS model such that the one or more generated object-shape templates maximally correlate to the MPS model; (4) assign to each of the one or more positioned object-shape templates a unique event reference and assigning the same unique event reference to cells within or in the vicinity of each corresponding object-shape template; (5) provide depositional or structural coordinates to each cell associated with a given event number in the MPS model using a relative position of the cell within the object associated with the event number; and (6)model properties using the depositional or structural coordinates to capture geological trends within each object-shape template.

In addition, as it can be further appreciated from the above description, the computer readable memory 130 can be configured to store input data comprising conditioning data and constraints and training-image generation parameters. The processor 120 can be configured to read input data including the conditioning data and constraints and the training-image generation parameters to: (1) create a multi-point statistics (MPS) model using a MPS method that satisfies conditioning data and constraints in which the multi-point statistics are derived from a training image created using training-image generation parameters; (2) generate one or more object-shape templates of a 2D or 3D object-shape and depositional or structural coordinates of each facies type using the training image generation parameters; (3) position the one or more generated object-shape templates within the MPS model such that the one or more generated object-shape templates maximally correlate to the MPS model; (4) assign to each of the one or more positioned object-shape templates a unique event reference and assigning the same unique event reference to cells within or in the vicinity of each corresponding object-shape template; (5) determine which cells are to be left unedited and which cells are available for editing; and (6) assign the cells that are available for editing to facies if the cells that are available for editing are contained by a facies object-shape template positioned within the MPS model at its optimally correlating location.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer implemented hybrid method for combining multipoint statistic and object-based methods comprising:
    creating, using a computer system, a multi-point statistics (MPS) model using a MPS method that satisfies conditioning data and constraints in which the multi-point statistics are derived from a training image created using training-image generation parameters;
    generating, using the computer system, one or more object-shape templates of a 2D or 3D object-shape and depositional or structural coordinates of each facies type using the training image generation parameters;
    positioning, using the computer system, the one or more generated object-shape templates within the MPS model such that the one or more generated object-shape templates maximally correlate to the MPS model;
    assigning, using the computer system, to each of the one or more positioned object-shape templates a unique event reference and assigning the same unique event reference to cells within or in the vicinity of each corresponding object-shape template;
    determining, using the computer system, which cells are to be left unedited and which cells are available for editing;
    assigning, using the computer system, the cells that are available for editing to facies if the cells that are available for editing are contained by a facies object-shape template positioned within the MPS model at its optimally correlating location.

2. The method according to claim 1, wherein assigning the cells that are available for editing to facies comprises, for each facies taken in the order of increasing continuity, only assigning a limited number of object-shape templates where the limited number of object-shape templates allows matching target facies proportion.

3. The method according to claim 1, wherein assigning the cells that are available for editing to facies comprises, for each facies taken in the order of increasing continuity, only assign a limited part of each object-shape template where the limited part of each object-shape template allows matching target facies proportion.

4. The method according to claim 1, wherein assigning to each of the one or more positioned object-shape templates comprises assigning each cell in the MPS model except for background facies cells to a specific object shape template positioned within the model at its optimally correlating location.

5. The method according to claim 1, wherein assigning to each of the one or more positioned object-shape templates comprises assigning each cell in the MPS model except for background facies cells to an object event number which starts at an index of one for each facies, wherein lower objects event numbers indicate objects that better fit the MPS simulation.

6. The method according to claim 1, wherein determining which cells are to be left unedited and which cells are available for editing comprises:
    obtaining, using the computer system, a facies probability cube either by using a probability cube used in the creating of the MPS model or using a 3D smoothing filter in each cell for each facies;
    inputting parameters, into the computer system, the parameters including order of the facies such that a subsequent facies has a greater continuity than a preceding facies, and a maximum facies probability is unmodified; and
    editing all cells outside of conditioning data locations in which facies probabilities for each facies, taken in order of increasing continuity, is greater than the maximum facies probability to leave unmodified.

7. The method according to claim 6, further calculating, using the computer, relative facies probabilities or target facies proportions from the facies probabilities.

8. The method according to claim 7, wherein the calculating comprises calculating the relative facies probabilities or target facies proportions from the facies probabilities by dividing by the maximum probability for each facies.

9. The method according to claim 6, further comprising initializing the editing by setting the edited MPS model to a non-edited original MPS model.

10. The method according to claim 1, further comprising, if matching target facies proportions is needed, for each facies:
    creating a list of events with hard data of all object event references that are assigned to model cells that contain hard-data;
    calculating a total number of required cells of facies in the final model to match the target facies proportion; and
    calculating an additional number of cells to be assigned to facies, the additional number of cells being equal to a difference between the target facies proportion and a length of the list of events with hard data.

11. The method according to claim 10, further comprising, if the additional number of cells is equal to or greater than zero, then:
    calculating the number of cells assigned to each object event number which is not in the list of events with hard data;
    calculating a cumulative number of cells as a function of event number; and
    finding an event number cutoff such that the cumulative number of cells with event number less than event number cutoff is approximately equal to the additional number of cells to be assigned to facies.

12. The method according to claim 10, further comprising, if the additional number of cells is less than zero, then:
    calculating the cumulative number of cells assigned to a facies as a function of the vertical depositional coordinate, wherein a vertical coordinate of zero is at the base of the object; and
    finding the vertical depositional coordinate cutoff such that the cumulative number of cells with vertical depositional coordinates less than the vertical depositional cutoff is approximately equal to the additional number of cells to be assigned to facies.

13. The method according to claim 12, further comprising repeating, for each facies taken in the order of increasing continuity, visiting all cells with the additional cutoff constraints of event number cutoff or vertical depositional coordinate cutoff.

14. The method according to claim 1, wherein the training image generation parameters comprise object shapes, orientation, position, or size, or any combination thereof.

15. The method according to claim 1, wherein using the MPS method includes building a grid in a desired geological region and interpreting facies at specific cells within the grid.

16. The method according to claim 15, wherein the MPS method comprises building a training image using object-based models.

17. The method according to claim 15, wherein the MPS method further comprises performing an MPS simulation to obtain a simulated image showing a MPS facies model.

18. The method according to claim 1, wherein generating the one or more object-shape templates comprises using one or more objects within the training image that are isolated from other objects within the training image when the training image is generated with more than one object.

19. The method according to claim 1, wherein the positioning of the one or more generated object-shape templates within the MPS model comprises convolving the one or more object-shape templates with the MPS model to produce a convolution score volume for each of the one or more object-shape templates.

20. The method according to claim 19, further comprising normalizing the convolution score by its standard deviation.

21. The method according to claim 20, wherein the positioning comprises finding a local maximum of the convolution score, and positioning an object-shape in the one or more object shapes within the MPS model according to its local maximum.

22. The method according to claim 19, wherein the convolving comprises using one or more 2D object-shape templates instead of one or more 3D object-shape templates, the one or more 2D object-shape templates being created by projecting the one or more 3D object-shape templates onto a map-view slice of the MPS model.

23. The method according to claim 1, wherein assigning to each of the one or more positioned object-shape templates the unique event reference comprises assigning to each of the one or more positioned object-shape templates a unique event number.

24. The method according to claim 23, wherein assigning to each of the one or more positioned object-shape templates the unique event number comprises identifying object shapes within the MPS model that best match each facies by using 2D or 3D normalized convolution scores.

25. A computer system for implementing a hybrid method for combining multipoint statistic and object-based methods, the computer system comprising:
a computer readable memory configured to store input data comprising conditioning data, constraints, and training-image generation parameters; and
a processor configured to read input data including the conditioning data and constraints and the training-image generation parameters to:
create a multi-point statistics (MPS) model using a MPS method that satisfies conditioning data and constraints in which the multi-point statistics are derived from a training image created using training-image generation parameters;
generate one or more object-shape templates of a 2D or 3D object-shape and depositional or structural coordinates of each facies type using the training image generation parameters;
position the one or more generated object-shape templates within the MPS model such that the one or more generated object-shape templates maximally correlate to the MPS model;
assign to each of the one or more positioned object-shape templates a unique event reference and assigning the same unique event reference to cells within or in the vicinity of each corresponding object-shape template;
determine which cells are to be left unedited and which cells are available for editing; and
assign the cells that are available for editing to facies if the cells that are available for editing are contained by a facies object-shape template positioned within the MPS model at its optimally correlating location.

26. The computer system according to claim 25, wherein the processor is configured to assign a limited number of object-shape templates or a limited part of each object-shape template where the limited number of object-shape templates or the limited part of each object-shape template allows matching target facies proportion.

27. The computer system according to claim 25, wherein the processor is configured to assign each cell in the MPS model except for background facies cells to an object event number which starts at an index of one for each facies, wherein lower objects event numbers indicate objects that better fit the MPS simulation.

28. The computer system according to claim 25, wherein the processor is configured to:
obtain a facies probability cube either by using a probability cube used in the creating of the MPS model or using a 3D smoothing filter in each cell for each facies;
receive parameters including order of the facies such that a subsequent facies has a greater continuity than a preceding facies, and a maximum facies probability is unmodified; and
edit all cells outside of conditioning data locations in which facies probabilities for each facies, taken in order of increasing continuity, is greater than the maximum facies probability to leave unmodified.

29. The computer system according to claim 25, wherein the processor is configured to:
create a list of events with hard data of all object event references that are assigned to model cells that contain hard-data;
calculate a total number of required cells of facies in the final model to match the target facies proportion; and
calculate an additional number of cells to be assigned to facies, the additional number of cells being equal to a difference between the target facies proportion and a length of the list of events with hard data.

30. The computer system according to claim 25, wherein the training image generation parameters comprise object shapes, orientation, position, or size, or any combination thereof.

31. The computer system according to claim 25, wherein the processor is configured to use one or more objects within the training image that are isolated from other objects within the training image when the training image is generated with more than one object.

32. The computer system according to claim 25, wherein the processor is configured to convolve the one or more object-shape templates with the MPS model to produce a convolution score volume for each of the one or more object-shape templates.

33. The computer system according to claim 25, wherein the processor is configured to assign to each of the one or more positioned object-shape templates a unique event number.

34. The computer system according to claim 33, wherein the unique event number comprises identifying object shapes within the MPS model that best match each facies by using 2D or 3D normalized convolution scores.

* * * * *